United States Patent [19]
Fathauer

[11] 3,881,353
[45] May 6, 1975

[54] ULTRASONIC SENSOR
[75] Inventor: George H. Fathauer, Mesa, Ariz.
[73] Assignee: Dickey-John Corporation, Auburn, Ill.
[22] Filed: Apr. 29, 1974
[21] Appl. No.: 465,314

[52] U.S. Cl............. 73/194 A; 73/67.6; 235/92 PC; 324/72 CP
[51] Int. Cl................................................ G01f 1/00
[58] Field of Search............ 73/28, 61 R, 67.5, 67.6, 73/432 PS, 194 A, 561, 194 M; 324/72 CP; 235/92 PC:92 FL

[56] References Cited
UNITED STATES PATENTS

| | | | |
|---|---|---|---|
| 2,966,057 | 12/1960 | Heller | 73/67.6 |
| 3,133,445 | 5/1964 | Richard | 73/432 PS |
| 3,779,070 | 12/1973 | Cushman et al. | 73/432 PS |

FOREIGN PATENTS OR APPLICATIONS

| | | | |
|---|---|---|---|
| 1,463,953 | 11/1966 | France | 73/432 PS |

Primary Examiner—Charles A. Ruehl
Attorney, Agent, or Firm—Olson, Trexler, Wolters, Bushnell & Fosse, Ltd.

[57] ABSTRACT

The embodiment of the invention disclosed herein is directed to a sensing device for determining the passage of high velocity, relatively small articles such as seeds being planted through high volume automatic planting apparatus used by farmers. The sensing device has a pair of spaced apart ultrasonic transducer elements, one acting as a transmitter and the other acting as a receiver. The driving circuit for the transmitting transducer has a feedback path coupled to the receiving amplifier of the receiving transducer. The pair of transducers, together with their respective driving and receiving circuits, form a closed loop oscillator circuit which includes the air gap between the transmitting and receiving elements. The spacing between the transmitting and receiving elements is maintained an integral number of half wavelengths to provide maximum sensitivity to high velocity small articles passing therebetween.

14 Claims, 3 Drawing Figures

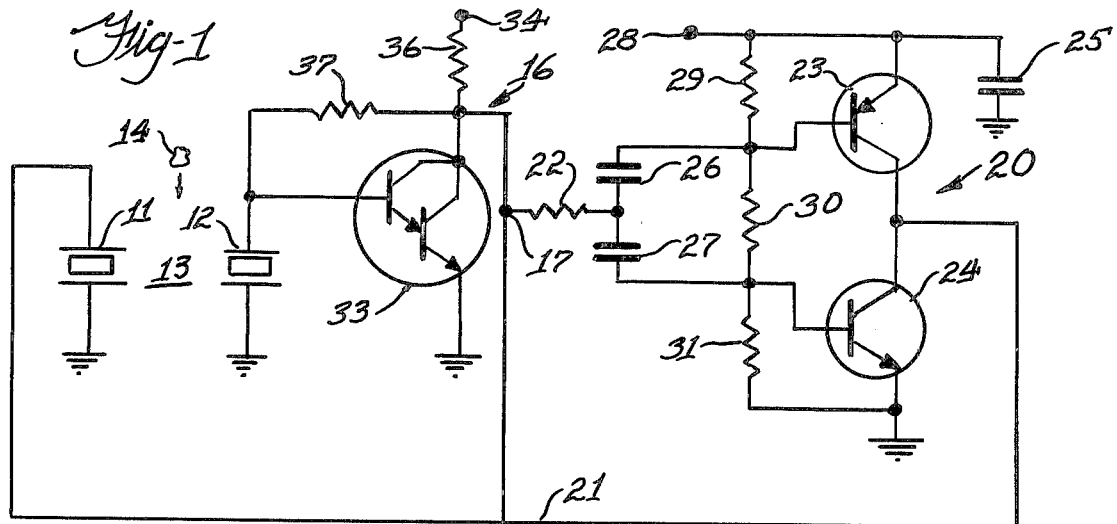
Fig-1
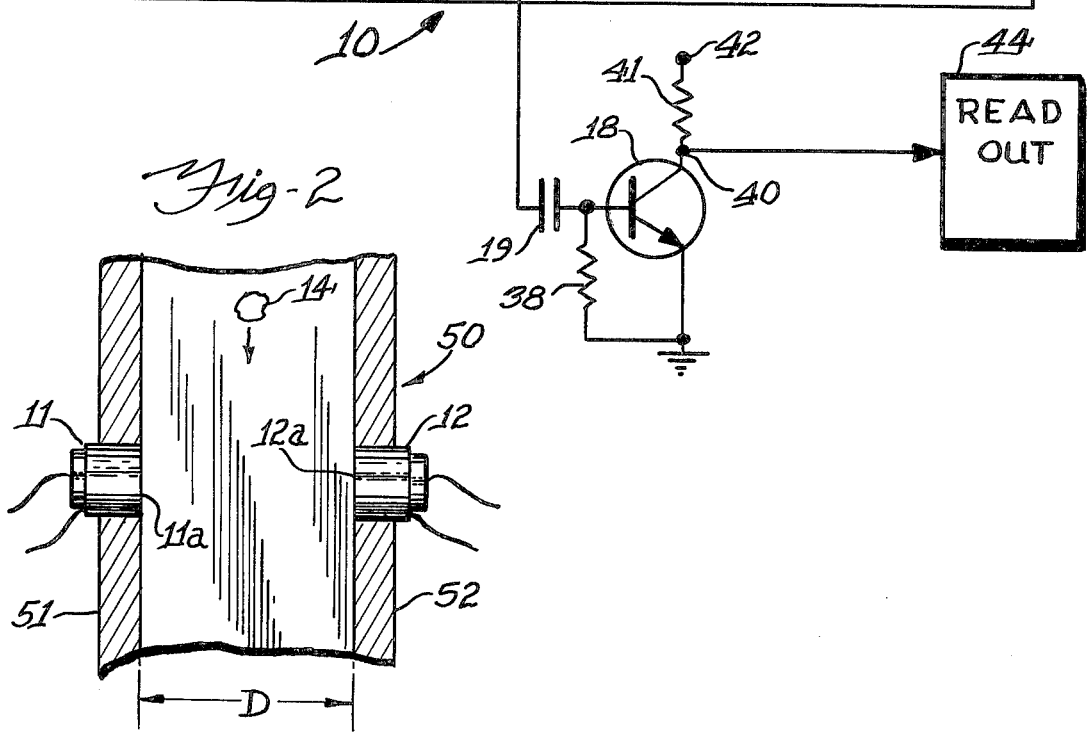
Fig-2
Fig-3

ULTRASONIC SENSOR

BACKGROUND OF THE INVENTION

This invention relates generally to improvements in the structure of sensing devices used primarily for detecting the passage of high velocity, relatively small articles, and more particularly to a seed sensing device, and its combination of circuitry, that provide substantial useful improvements over existing seed sensing devices which are now commonly used in the agricultural field. However, it will be understood that while this invention is directed particularly to devices used in the field of seed planting, the specific device and circuitry disclosed herein can be used in other allied fields such as sensing the passage of projectiles through a given region or the like.

The seed sensing device and its associated circuitry disclosed herein can be used on seed monitoring apparatus similar to that disclosed in Pat. No. 3,723,989 issued Mar. 27, 1973 and assigned to the same assignee of record. This patent is directed to an electronic planter monitor to which the output signal from the circuitry illustrated herein can be coupled to provide a direct readout of the seed population being planted.

As is well-known, a farmer engaged in mechanized planting of various seeds utilizes a planting machine pulled behind a tractor. Such planting machines usually include a plurality of spaced apart planting devices each supplied with seed from a separate hopper or container so that a plurality of rows of seeds may be planted at one time. The planting equipment used before the development of the disclosure set forth in the above-mentioned patent make it difficult if not impossible for a farmer to determine the actual number of seeds over a given area or seed population being planted. With the development of the structure set forth in said patent this is now possible. However, the power requirements for such prior art sensing devices are relatively high, sometimes in the order of 600 milliwatts or more for each sensor. Furthermore, the high reliablity of the previous planting apparatus required that the seeds be focused through the discharge chute through a relatively small cross sectional area so that a photoelectric detecting system could be used to detect the passage of the seed.

SUMMARY OF THE INVENTION

Accordingly, it is an object of this invention to provide a new and improved sensing device which is capable of detecting the passage of high velocity, relatively small articles such as seeds passing through a planting apparatus with a high degree of reliability and accuracy.

Still another object of the present invention is to provide a new and improved seed sensing device which operates on substantially less power consumption than devices heretofore utilized, thereby making it possible for self-contained battery power supplies to be used at each seed sensor.

Still another object of this invention is to provide a new and improved seed sensing device which is capable of detecting the passage of seed through an opening of relatively large cross sectional area, thereby eliminating the need for focusing of the seed passage to a relatively small cross sectional area.

Briefly, the seed sensing device of this invention includes a pair of piezoelectric ceramic elements secured to opposite sides of a seed dispensing chute. One of the piezoelectric elements functions as a transmitting device while the other of the piezoelectric elements functions as a receiving device. A driving circuit is coupled to the transmitting device and a receiving circuit is coupled to the receiving device with a coupling between the driving circuit and receiving circuit functioning as a feedback circuit. The combination of driving, receiving and coupling circuits, together with the piezoelectric devices and the air gap therebetween, function to form a self-sustained oscillator operating at a predetermined frequency. The wavelength of the ultrasonic energy passing between the piezoelectric devices is determined by the velocity of propagation divided by the frequency. The distance between the transmitting device and receiving device is maintained an integral number of half wavelengths to insure maximum sensitivity of the overall circuit configuration so that the slightest change in frequency and/or coupling can be detected. Therefore, articles passing between the transmitting and receiving piezoelectric devices, which cause a slight change in frequency of the circuit, can be detected even at relatively high velocities. The output of the receiving circuit is also coupled to a pulse-forming circuit which produces a count output signal which can be delivered to any suitable readout counter circuit or device to provide seed count information.

Many other objects, features and advantages of this invention will be more fully realized and understood from the following detailed description when taken in conjunction with the accompanying drawings wherein like reference numerals throughout the various views of the drawings are intended to designate similar elements or components.

BRIEF DESCRIPTION OF THE DRAWINGS

FIG. 1 is a schematic circuit diagram of the circuitry used in conjunction with the sensing device of this invention;

FIG. 2 is a fragmentary sectional view illustrating the mounting of a pair of piezoelectric ceramic elements to a seed discharge chute so as to maintain the distance between the elements an integral number of half wavelengths; and FIG. 3 is a waveform which illustrates that the distance D of FIG. 2 is maintained an integral number of half wavelengths.

DETAILED DESCRIPTION OF THE ILLUSTRATED EMBODIMENT

Referring now to the drawings, there is seen a seed sensing device for detecting the passage of high velocity seeds through a chute. FIG. 1 of the disclosure illustrates the circuit schematic diagram of the device and is designated generally by reference numeral 10. The circuit configuration 10 shows a pair of spaced apart piezoelectric transducer elements 11 and 12 which function as a transmitting ultrasonic device and a receiving ultrasonic device, respectively. In the illustrated embodiment the ceramic elements 11 and 12 are mass-loaded piezoelectric devices. The spacing 13 between the piezoelectric devices is arranged to receive a plurality of successive high velocity seeds designated generally by reference numeral 14. The passage of each seed between the transmitting and receiving devices produces a change in the output amplitude of a receiver amplifier circuit 16. This change in output amplitude is sensed at a circuit point 17 which, in turn, is capacitive coupled to an output transistor 18 through a capacitor 19.

The transmitting ultrasonic transducer element 11 is driven by a driver amplifier circuit arrangement 20 which is connected thereto over a line 21. The combination of the driver circuit 20 and the receiver circuit 16 together with the transmitting and receiving ultransonic transducer elements 11 and 12, respectively, and the air gap 13 therebetween function as a closed loop oscillator circuit. The feedback for the oscillator circuit is obtainted from circuit point 17 back to the input of the driver stage 20 through a resistor 22. This feedback is coupled to the base electrode of a pair of transistor elements 23 and 24 through their respective base coupling capacitors 26 and 27. Transistors 23 and 24 are operated as a push-pull amplifier stage to provide driving power for the ultransonic transducer element 11. The emitter of transistor 23 is connected to one end of a filter capacitor 25.

Operating bias potential for transistors 23 and 24 is obtained from a 6 volt source connected to terminal 28 which, in turn, has resistor 29 connected thereto for applying bias voltage to the base electrode of transistor 23. Bias voltage is applied to the base electrode of transistor 24 through a resistor 30 which, in turn, forms a voltage divider network with a resistor 31 having the other end thereof connected to ground potential. The junction between the collector electrodes of transistors 23 and 24, therefore, provides the output which is coupled to ultrasonic transducer element 11 over the line 21.

The receiver amplifier circuit 16 is here illustrated as formed by a pair of direct current coupled transistors in a darlington configuration as illustrated by reference numeral 33. While a single conventional unit can be used, i.e., a single container having two transistors connected as shown in the schematic, it will be understood that two separate transistor elements can be used to form the darlington circuit configuration. Furthermore, it will be understood that operational amplifiers or other high gain amplifier circuits can be used. Operating voltage for the receiver amplifier state 16 is obtained from a circuit point 34 which, in turn, is connected to the collector electrodes of the darlington transistor configuration through a resistor 36. Base bias voltage is applied to the circuit through a resistor 37.

The output transistor 18 receives the alternating current voltage from circuit point 17, which may be in the order of about 80 KHz, and rectifies this voltage between the base emitter junction. This, together with a DC bias developed across capacitor 19 and a resistor 38, will cause transistor 18 to be rendered conductive so that the output terminal 40 thereof is substantially at ground potential. A reduction of coupling energy between the transmitting device 11 and the receiving device 12 will cause a reduction in the amplified signal at terminal point 17 which, in turn, will render transistor 18 substantially instantaneously nonconductive to produce a positive potential pulse at output terminal 40. This positive potential pulse is developed across a load resistor 41 connected to a power supply terminal 42. The positive output pulse is then coupled to a readout device 44 which may take the form of the readout device disclosed in my U.S. Pat. No. 3,723,989 for electronic planter monitoring devices.

Most advantageously, the seed chute through which the seeds are directed en route to be planted provides a support area, designated generally by reference numeral 50 of FIG. 2, so that the ultrasonic transducer elements 11 and 12 are fixedly supported a distance D apart. As the seed 14 passes through the support portion of the chute, the ultrasonic field is disturbed to produce the output signal necessary for rendering transistor 18 nonconductive. FIG. 3 illustrates that the distance D is maintained an integral number of half wavelengths of the ultrasonic energy so that maximum efficiency of coupling between the transmitting element 11 and receiving element 12 is maintained. This integral number of half wavelengths of the spacing 13 substantially increases the sensitivity of the overall oscillator circuit so that high velocity, relatively small articles passing therethrough will produce a detectable change at circuit point 17. While FIG. 3 illustrates seven half wavelengths or three and one-half full wavelengths of the transmitting energy as corresponding to the distance D, it will be understood that any suitable number of half wavelengths may be utilized.

In the illustrated embodiment, at the frequency of 80 KHz, one half wavelength corresponds to approximately eighty thousandths of an inch. This dimension is determined by the product of the frequency and the velocity of propagation of the ultrasonic energy between the transmitter element 11 and the receiver element 12.

The support structure 50 of FIG. 2 may be a tubular structure, round or rectangular in configuration, and providing diametrically opposed wall portions 51 and 52. The piezoelectric elements 11 and 12 are secured to the wall portions 51 and 52, respectively, so that their transmitting and receiving surfaces 11a and 12a, respectively, are spaced apart but in an opposing relation to one another. When the support structure 50 is formed of a rectangular tube, the entire space between the piezoelectric elements 11 and 12 is sensitive to the passage of seeds and, therefore, provides a substantial increase in reliability of the structure. Furthermore, the circuit illustrated herein will operate from a power source of approximately 4 milliwatts, this being readily obtained from a small 6 volt battery. A power source formed from a plurality of penlight cells to obtain 6 volts may operate the illustrated circuit continuously for 24 hours a day for a period of 2 months. The seed sensing apparatus illustrated herein also is relatively low in cost as compared to some of the prior art structures.

While a single specific embodiment of the present invention has been illustrated herein, it will be understood that variations and modifications may be effected without departing from the spirit and scope of the novel concepts disclosed and claimed herein.

The invention is claimed as follows:

1. In a sensing device for determining the passage of high velocity, relatively small articles, the combination comprising: ultrasonic transducer means having an ultrasonic transmitting portion and an ultrasonic receiving portion, said transmitting portion radiating ultrasonic energy having a predetermined wavelength which is determined by the velocity of propagation of the ultrasonic signal divided by the frequency between said transmitting portion and said receiving portion, support means for receiving and holding said transmitting portion and said receiving portion and maintaining a spacing therebetween, said spacing being an integral number of half wavelengths of said predetermined wavelength, amplifier means coupled to said receiving portion of said ultrasonic means to produce an output signal corresponding to the signal received from said transmitting portion and output means coupled to said amplifier means to produce a count signal in response to a change in amplitude of said output signal, whereby high velocity, relatively small articles passing between said transmitting and receiving portions will produce a change in amplitude of said output signal to correspond to said count signal.

2. In the sensing device for determining the passage of high velocity, relatively small articles as set forth in claim 1 wherein said support means is a guide chute adapted to receive seeds therethrough as they are being planted, said output means being coupled to a count readout device which provides a readout as to the number of seeds that have been planted.

3. In the sensing device for determining the passage of high velocity, relatively small articles as set forth in claim 2 wherein said transmitting and receiving portions are separate and discrete elements spaced apart from one another and which have their respective radiating and receiving surfaces facing one another.

4. In the sensing device for determining the passage of high velocity, relatively small articles as set forth in claim 3 wherein said discrete spaced apart elements are mass-loaded piezoelectric ceramic elements.

5. In the sensing device for determining the passage of high velocity, relatively small articles as set forth in claim 1 wherein said change in amplitude of said output signal is a decrease in amplitude.

6. In the sensing device for determining the passage of high velocity, relatively small articles as set forth in claim 1 wherein said amplifier means is formed by a pair of direct current coupled transistors.

7. In the sensing device for determining the passage of high velocity, relatively small articles as set forth in claim 6 wherein said direct current coupled transistors have their collector electrodes tied together and the emitter electrode of one transistor directly connected to the base electrode of the other transistor.

8. In the sensing device for determining the passage of high velocity, relatively small articles as set forth in claim 1 further including drive amplifier means coupled to said transmitting portion of said ultrasonic transducer means, said amplifier means having the output thereof coupled to the input of said drive amplifier to provide a closed loop oscillator circuit including said transmitting portion, said receiving portion, said amplifier means and said driver amplifier.

9. In the sensing device for determining the passage of high velocity, relatively small articles as set forth in claim 1 wherein said output means is a transistor having base, emitter and collector electrodes, said base electrode coupled to said amplifier means to receive said output signal and bias the base emitter junction of said transistor to render the transistor conductive, said change in amplitude of said output signal rendering said transistor nonconductive to produce said count signal.

10. In the sensing device for determining the passage of high velocity, relatively small articles as set forth in claim 9 wherein said transistor is coupled to said output means through a capacitor.

11. In a sensing device for determining the passage of high velocity, relatively small articles the combination comprising: a first ultrasonic transducer means for transmitting ultrasonic wave energy therefrom, a drive circuit coupled to said first ultrasonic transducer means for driving the same at a predetermined output frequency, second ultrasonic transducer means spaced from said first ultrasonic transducer means for receiving output signals therefrom over an air gap therebetween, a receiving circuit coupled to said second ultrasonic transducer means for receiving and amplifying the ultrasonic signals sensed thereby, a circuit point connected to the output of said receiving circuit, said circuit point having an amplified signal applied thereto from said receiving circuit, coupling circuit means between said output circuit point and the input of said driver circuit to provide a feedback path thereto, said output circuit point also being coupled to readout means, said first ultrasonic transducer element, said driver circuit, said second ultrasonic transducer element, said receiver circuit, said coupling circuit means and said gap forming a closed loop oscillator circuit operating at said predetermined frequency.

12. In the sensing device for determining the passage of high velocity, relatively small articles as set forth in claim 11 wherein said driver circuit is a push-pull amplifier circuit, and wherein said receiver circuit is formed by a pair of direct current coupled transistors having their collector electrodes tied together and the emitter electrode of one transistor direct current coupled to the base electrode of the other transistor.

13. In the sensing device for determining the passage of high velocity, relatively small articles as set forth in claim 12 wherein said first and second ultrasonic transducer means are mass-loaded piezoelectric ceramic elements.

14. In the sensing device for determining the passage of high velocity, relatively small articles as set forth in claim 11 wherein the dimension of said gap between said first and second ultrasonic transducer elements is an integral number of half wavelengths of said predetermined frequency.

* * * * *